Oct. 11, 1938.　　　　F. T. ELDER　　　　2,132,821

LOCK NUT

Filed Oct. 2, 1935

INVENTOR
Frank T Elder

Patented Oct. 11, 1938

2,132,821

UNITED STATES PATENT OFFICE 2,132,821

LOCK NUT

Frank T. Elder, Bakersfield, Calif., assignor of fifty-one one-hundredths to Frank T. Elder, twenty-four and one-half one-hundredths to Earl W. Smith, and twenty-four and one-half one-hundredths to Arthur R. Cassidy, a partnership Application October 2, 1935, Serial No. 43,223

1 Claim. (Cl. 151—17)

My invention relates to improvements in the methods and means used in uniting in coacting or cooperating combination nuts and bolts, with the primary objective of obtaining a positive nut locking result not only at the time of installation, but throughout the complete period of useful application regardless of the loosening and releasing effect normally resultant from the tension stresses exerted upon the nuts by the materials which they contact and in cooperation with which they function.

Another object of my invention is to provide a positive nut locking device which from the moment of installation shall function satisfactorily through self-contained means without the aid of auxiliary or assisting external devices, parts or the mechanical stresses engendered thereby.

A further object of my invention is to provide a nut locking device which shall possess features permitting ease of installation adjustment, adjustment and removability with the further feature of lack of deformation or destruction of the component parts, thus allowing the individual parts of the device to be disassembled and re-used whenever such action is found advisable.

One of the undesirable basic conditions resulting from normal use which my device overcomes is that, when a load bearing nut is tightened to its permissible maximum, the stress is sustained by the engaging sides of the nut and bolt threads which are nearest to or facing the article or material being held or clamped. This condition likewise applies to the auxiliary locking nut. After a period of use, mechanical vibration and expansion and contraction movements consequent on changing temperature conditions gradually decrease by attribution or compress by other means the cross-sectional area of the clamped material, thus reducing the initial stress of the engaging sides of the nut and bolt threads. When the clamped material finally becomes sufficiently worn or compressed so as to furnish little or no strain to be sustained by the engaging nut and bolt threads, the stress of the load bearing nut, through elastic and other forces, is transferred from the sides of the nut and bolt threads nearest to or facing the clamped article to the opposite sides of the nut and bolt threads; that is, those furthest away from the clamped material. The resultant effect is that the stress and frictional loads exerted by the lock nut on the load bearing nut decrease approximately in proportion to the separating movement allowed by the mechanical clearances of the threads. This decrease in stress between the two nuts reduces the frictional hold mutually exerted by the engaging bearing surfaces of the two nuts to such an extent that dependence cannot be placed with satisfactory security on their locking action.

Another basic condition of use in which my device is designed to function satisfactorily is that existing when conditions require that nuts shall be immovably locked on a threaded shaft or bolt at a point entirely independent and separated from external material which normally in other types of construction is held or tightly-clamped between the load bearing nut and the head of the bolt or other similar means.

My invention not only furnishes a device which is applicable to conditions requiring that a lock nut and load nut installed under and subject to external initial stress shall effectively function as a lock nut whether the initial stress is permanent, gradually decreases in amount or becomes finally non-existent, but my invention also furnishes a device which is applicable to conditions requiring that a lock nut and companion nut installed under the absence of external initial stress shall effectively function as a lock nut structure through inherent self-contained means in which all parts mutually cooperate and so-act together to form practically a solid or homogeneous mass possessing a constant predetermined spaced relation with respect to the shaft or bolt.

Other objects and results of my invention will be apparent from the following description thereof taken in connection with the accompanying sheet of drawings in which.

Figure 1:
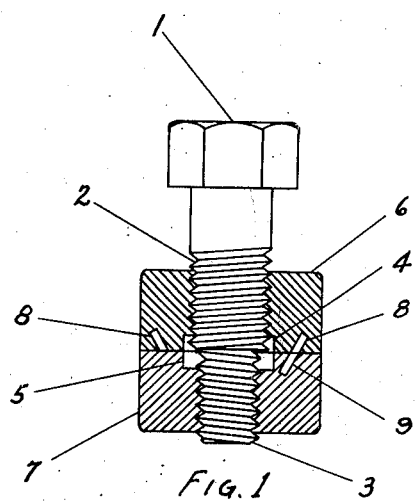
Figure 1 is a partly cross-sectional elevation illustrating the assembled relative functioning positions of the essential elements of my nut locking and positioning device.
Figure 3:
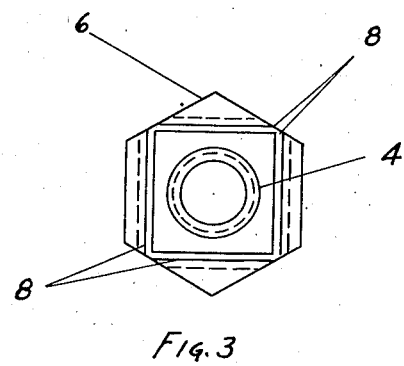
Figure 3 is a plan view of the mutually tangent transverse bearing surface of one of the nuts showing the key ways provided for insertion of a locking key.
Figure 2:
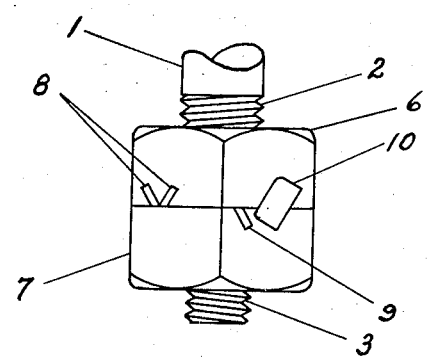
Figure 2 is a side elevation of the assembled device disclosing a method of securing the locking key to prevent accidental dislocation and permitting removal and re-use.
Figure 4:
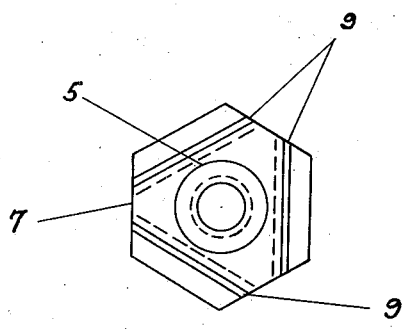
Figure 4 is a plan view of the mutually tangent transverse bearing surface of the other nut showing the key ways provided for insertion of a locking key.
Figure 5:
Figure 5 is a top view of the locking key.
Figure 6:
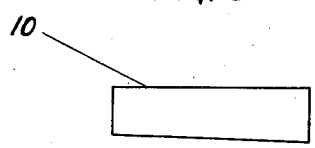
Figure 6 is a side view of the locking key illustrating the taper provided to more securely effect a positive and permanent locking action.

Referring now in general to the drawing Figures 1 to 5 inclusive: My invention as here illustrated for descriptive purposes consists essentially of a bolt or shaft, 1, with one section of right hand thread, 2, an adjacent and coaxial section of left hand threads, 3, a nut with right hand threads, 6, assembled to the right hand threaded section, 2, of bolt or shaft, 1, and a nut with left hand threads, 7, assembled to the left hand threaded section, 3, of the bolt or shaft, 1, the contacting adjacent bearing surfaces of the nuts, 6 and 7, are provided with numerous appropriately positioned slots respectively, 8 and 9, certain of which form on rotation of the nuts, 6 and 7, on the bolt or threaded shaft, 1, to a position having the nut bearing surfaces in stressed contacting relation and to a mutually superimposed and coincident position of the slots, 8 and 9, an inclined key way in which the locking key, 10, is inserted and securely fastened; all of which items and instrumentalities so coacting and cooperating together in combination as to prevent opposite or same directional independent or co-existant rotational movement and longitudinal axial separation or closure of the nuts, 6 and 7, thus effectively producing a self-contained and self-sufficient action which locks all the component parts together into a spaced relation of constant predetermined positioning on to the bolt or threaded shaft, 1, and the two nuts, 6 and 7.

Referring now in detail to the Figures 1 to 5 inclusive of the drawing: 1 is a bolt or shaft having two threaded sections or areas, 2 and 3. Section 2 is provided with a right hand thread and section 3 with a left hand thread.

The bore of the nut 6, is provided with a right hand thread suitably dimensioned to properly engage with the right hand threaded section 2, of bolt or shaft 1. The outer transverse surface of the nut 6, which seats against and receives the full bearing pressure exerted by the contacting surface of the nut 8, when both nuts 6 and 7, are in contact and clamped together as a result of the required rotational movement is provided with a number of slots 8, so dimensioned as to form part of a key way. In other embodiments of my invention the slots 8, may differ in number from the number of slots 8, disclosed in the drawing. For purposes of illustration the number of slots 8, as shown for nut 6, is used only since such a number of slots 8, in cooperation with the number of slots, 9, shown for nut 7, results in an effective key way for the locking key 10, at every one-twelfth of a revolution or 30 degrees mutually relative positioning of the nuts 6 and 7.

The bore of nut 7, is provided with a left hand thread suitably dimensioned to properly engage with the left hand threaded section 3, bolt or shaft 1. The outer transverse surface of the nut 7, which seats against, and receives the full bearing pressure exerted by the contacting surface of the nut 6, when both nuts 6 and 7 are in contact and clamped together as a result of the required rotational movement, is provided with a number of slots 9, so dimensioned as to form part of a key way. In other embodiments of my invention the slots 9, may differ in number from the number of slots 9, disclosed in the drawing. For purposes of illustration the number of slots 9, as shown for nut 7, is used only since such a number of slots 9, in cooperation with the number of slots 8, as shown for nut 6, results in an effective key way for the locking key 10, at every one-twelfth of a revolution or 30 degrees mutually relative positioning of the nuts 6 and 7.

The key 10, is so fabricated, from suitable material and so dimensioned as to properly fit the key way formed by the appropriate relative positioning of the slots 8, in nut 6, and the slots 9, in nut 7, in respect to shape, length, width and taper, and in respect to the provision of a sufficient amount of the key 10, external to and outside the openings of the key way in the nuts 6 and 7, as to permit the bending back of the ends of the key 10, around the sides of the nuts 6 and 7, or other suitable treatment effectively resulting in a secure locking of key 10, in the key way of nuts 6 and 7.

Referring further to Figures 1 to 5 of the drawing: It is shown that in my nut and bolt positioning and locking device, in order to accomplish the desired purpose of securely locking the nuts together in a predetermined constant spaced relation which however is capable of ready adjustment and change and also at the same time allows the re-use of the component parts, the shaft or bolt 1, is inserted and positioned in the material to be clamped, by means of suitable facilities, then the nut 6, having its transverse outer surface free of slots 8, faced toward or against the material to be clamped is properly applied to the right hand threaded section 2, of the shaft or bolt 1, and by the required turning or rotational movement, is cinched or tightly clamped and pressed against the contacted surface of the material or object located between the head of the shaft or bolt 1, and the nut 6; the companion nut 7, having its transverse outer surface containing the slots 9, faced toward or against the outer transverse surface containing the slots 8, of nut 6, is properly applied to the left hand threaded section of the shaft or bolt 1, and by the required turning or rotational movement is cinched or tightly clamped and pressed against the contacted transverse surface of the nut 6; nut 7 is then adjusted and rotated in such slight angular movement as will result in one or more of its slots 9, attaining a position superimposing, registering and coinciding with one or more of slots 8, of nut 6, thus forming a key way in which is tightly inserted key 10, the protruding ends of which are then bent or otherwise secured to prevent key 10, from loosening and falling out of the key way, and which ends remain in this bent or locking condition except when it is desired to remove the key in order to readjust or re-use any of the component parts.

When it is desired that the bolt and nuts be locked and positioned at a point where there is no immediately adjacent external material to be clamped or secured, the nut 6, is properly positioned, in respect to its transverse outer surface containing the slots 8, which surface is to contact the transverse outer surface containing the slots 9, of nut 7, then the subsequent operations are performed in a manner similar to the above or as required to effect the desired result.

After proper assembly of the component parts, the coating and cooperating functioning of the bolt, nuts and key as a unitary combination takes place in the following manner: If the nut 6, tends to start independent rotation in a right hand direction this tendency is transmitted to nut 7, by means of the key 10, positioned in the key way formed by the registering of slots 8 and 9, since the key way and key 10, by virtue of deviation from parallelism with a circumferential prolongation of any set radial point, exert on nut 7, through resistance to shearing action a rotational tendency on nut 7, equal to and in the same direction as the rotational tendency as nut 6, the resultant tendency of nut 7, as well as nut 6, to simultaneously rotate in a right hand direction, since nut 7, is provided with a left hand thread, and nut 6, is provided with a right hand thread, tends to produce separation between the nuts 6 and 7, in a direction parallel to the longitudinal axis of the bolt or shaft 1, but this tendency to separate is resisted by key 10, positioned in the key way formed by the registering of slots 8 and 9, since the key way and key 10, by virtue of deviation from parallelism with the longitudinal axes of bolt or shaft 1, exert on nuts 6 and 7, through resistance to shearing action, a constant position retaining force which prevents and is in direct opposition to the separating tendency consequent upon simultaneous right hand rotation of nuts 6 and 7. Thus since any tendency of nut 6, to rotate independently in a right hand direction is transmitted to nut 7, by key 10, and the longitudinal axial separation tendency of nuts 6 and 7, resultant from a tendency to simultaneous unitary rotation in a right hand direction of nuts 6 and 7, is resisted and prevented by key way and key 10, and the opposing threads of the nuts 6 and 7, and of the sections 2, and 3, of bolt or shaft 1, no independent or simultaneous rotation in a right hand direction, or longitudinal axial separation of nuts 6 and 7, is possible and the shaft or bolt 1, and the nuts 6 and 7, constantly retain their original predetermined inter-related spacing and positioning.

If the nut 6, tends to start independent rotation in a left hand direction this tendency is transmitted to nut 7, by means of key 10, positioned in the key way formed by the registering of slots 8 and 9, since the key way and key 10, by virtue of deviation from parallelism with a circumferential prolongation of any set radial point, exert on nut 7, through resistance to shearing action, a rotational tendency on nut 7, equal to and in the same direction as the rotational tendency of nut 6, the resultant tendency of nut 7, as well as nut 6, to simultaneously rotate in a left hand direction, since nut 7, is provided with a left hand thread, and nut 6, is provided with a right hand thread, tends to produce further closure between nuts 6 and 7, in a direction parallel to the longitudinal axis of shaft or belt 1, but this tendency to further closure is resisted and prevented by the fact that little opportunity exists for further closure since the nuts 6 and 7, were originally set up and tightened to a degree approximating the maximum closure; thus since any tendency of nut 6, to rotate independently in a left hand direction is transmitted to the nut 7, by key 10, and the longitudinal axial tendency to closure of nuts 6 and 7, resultant from a tendency to simultaneous unitary rotation in a left hand direction of nuts 6 and 7, is resisted and prevented by a degree of original set-up closure approximating the maximum, no independent or simultaneous rotation in a left hand direction or longitudinal axial closure of nuts 6 and 7, is possible and the shaft or bolt 1, and nuts 6 and 7, constantly retain their original predetermined interrelated spacing and positioning.

If instead of nut 6, the companion nut 7, tends to start independent rotation in either a right or left hand direction the functioning of the component parts results in the appropriate corresponding actions which constantly retain the nuts 6 and 7, in their original pre-determined interrelated spacing and positioning.

If the nuts 6 and 7, as a simultaneously rotating unit tend to start rotation in either a right or left hand direction independent of the shaft or bolt 1, the functioning of the component parts results in the appropriate corresponding actions which constantly retain nuts 6 and 7, in their original predetermined inter-related spacing and positioning.

In general wherever the terms shaft, threaded shaft, bolt and nut are used, as also in respect to the slots and key way and key for which may be substituted a machine screw, cotter pin, channel, or welded jointure of the nuts, such terms are meant to describe and include devices or means which may be used for obtaining similar or equivalent securing, locking and positioning results of the various component parts.

While a form of my invention is illustrated in the accompanying sheet of drawings and the preceding description, I realize that I have shown and described only one practical embodiment of my invention and I am aware that many changes can be made in the details of construction and arrangements thereof without departing from the spirit and scope of this invention, and I do not therefor, limit my invention to the details shown except as limited by the spirit and scope of my invention as disclosed and indicated above and in the following claim.

I claim as my invention:

In a coacting and cooperating bolt and nut locking structure; a bolt; a load bearing nut; a locking nut; a key way in said load bearing nut at an angular inclination to the longitudinal axis of said bolt; said key way in said load bearing nut also parallel to a transverse axis of said bolt; a key way in said locking nut at an angular inclination to the longitudinal axis of said bolt; said key way in said locking nut also parallel to a transverse axis of said bolt; said key way in said load bearing nut cooperating with said key way in said locking nut; a key fitting said cooperating key ways.

FRANK T. ELDER.